United States Patent [19]

Wallis

[11] Patent Number: 4,767,231
[45] Date of Patent: Aug. 30, 1988

[54] ADJUSTABLE ARM

[76] Inventor: Frederick A. Wallis, 9 Mosaic Street, Shelley, Western Australia, Australia

[21] Appl. No.: 779,783
[22] PCT Filed: Jan. 3, 1985
[86] PCT No.: PCT/AU85/00002
 § 371 Date: Aug. 28, 1985
 § 102(e) Date: Aug. 28, 1985
[87] PCT Pub. No.: WO85/03112
 PCT Pub. Date: Jul. 18, 1985

[30] Foreign Application Priority Data

Jan. 5, 1984 [AU] Australia ............... PG3080

[51] Int. Cl.⁴ .................................. F16C 11/06
[52] U.S. Cl. .............................. 403/56; 403/76;
 403/90; 403/55; 248/276; 285/907
[58] Field of Search ............. 403/53, 54, 55, 56,
 403/61, 76, 90; 248/160, 276; 285/907, 184

[56] References Cited

U.S. PATENT DOCUMENTS

| | | | |
|---|---|---|---|
| 1,927,703 | 9/1933 | Glowacki | 285/907 X |
| 2,935,348 | 5/1960 | Jones | 285/907 X |
| 3,240,516 | 3/1966 | Barish et al. | 403/54 |
| 3,278,207 | 10/1966 | Barish et al. | 403/55 |
| 3,367,616 | 2/1968 | Bausch et al. | 403/56 X |
| 3,679,236 | 7/1972 | Warshawshy | 285/184 X |
| 4,236,844 | 12/1980 | Mantele | 403/55 |
| 4,320,884 | 3/1982 | Leo | 248/276 |
| 4,402,481 | 9/1983 | Sasaki | 403/55 X |
| 4,431,329 | 2/1984 | Baitella | 403/55 |
| 4,531,855 | 7/1985 | Wallis | 403/55 |

FOREIGN PATENT DOCUMENTS

| | | | |
|---|---|---|---|
| 2717828 | 10/1978 | Fed. Rep. of Germany | 403/55 |
| 83/04078 | 11/1983 | PCT Int'l Appl. | 403/90 |
| 608874 | 1/1979 | Switzerland | 403/55 |

Primary Examiner—David H. Corbin
Assistant Examiner—Anthony Knight
Attorney, Agent, or Firm—Harness, Dickey & Pierce

[57] ABSTRACT

An adjustable arm having a plurality of sections joined together by a ball and socket joint comprising a housing, a ball retained within the housing, a concave cup slidably mounted within the housing with clearance between the cup and the ball, a locking member slidably mounted in a recess in the ball so that one end projects beyond the ball and bears against the concave face of the cup a push rod passing through the section so that one end bears against the cup adjacent one end of the section and the other end bears against the locking member of the joint adjacent the other end of the section and means for applying a compressive force to the push rod to simultaneously lock all joints against relative movement.

3 Claims, 6 Drawing Sheets

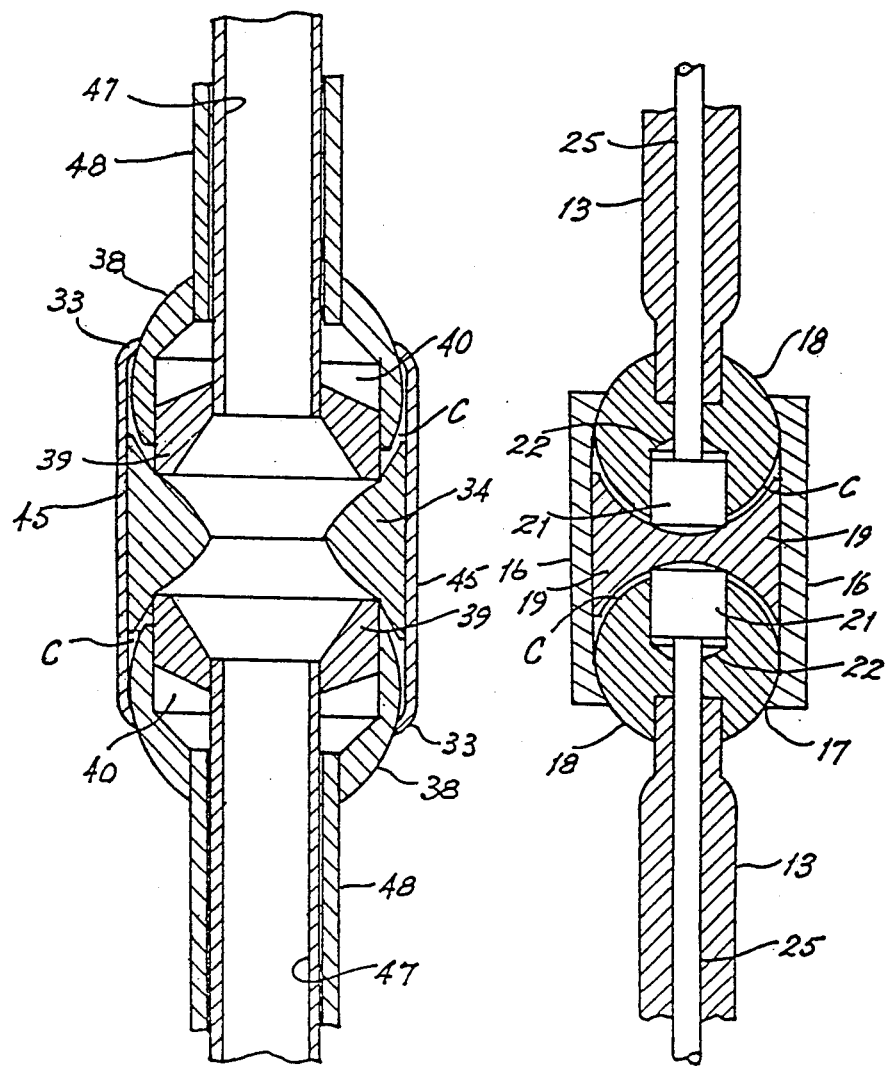

ADJUSTABLE ARM

BACKGROUND OF THE INVENTION

This invention relates to an adjustable arm and in particular to an arm consisting of a plurality of arm sections disposed in end to end relation with adjacent arm sections interconnected for angular movement therebetween about at least one axis and incorporating means for locking the interconnection.

Adjustable arms of the type to which this invention relates are well-known. For example in U.S. Pat. No. 3,278,207 there is a disclosure of a support structure having at least three joints which can be locked and unlocked simultaneously by a single movement, the structure involving at least one split ball joint. It has now been found that a more effective locking of the ball joint can be achieved by utilising a ball and socket joint, providing a locking member slidably mounted in a recess in the ball so that one end projects from the ball and bears against the socket, and applying a compressive force to the locking member by means of a compression member.

SUMMARY OF THE INVENTION

Thus in one form the invention resides in an adjustable arm divided into a pair of end sections and one or more intermediate sections, each section being coupled to the adjacent intermediate section through a ball and socket joint, each joint comprising a housing, a ball retained within the housing and a concave cup slidably mounted within the housing, characterised in that:

(i) there is a clearance between the concave cup and the ball;
(ii) each ball is provided with a recess which accommodates a locking member slidably mounted therein so that one end projects beyond the ball and bears against the concave face of the cup;
(iii) each section is provided with a compression member slidably mounted therein so that one end of the compression member bears against the cup of the joint adjacent said one end and the other end bears against the locking member of the joint adjacent said other end; and
(iv) means are provided for applying a compressive force to the free end of the compression member in one of the sections, whereby on the application of a compressive force the clearance between the cup and ball of each joint is reduced and the compressive force is transferred through the locking members and the compression members to lock successive joints.

BRIEF DESCRIPTION OF THE DRAWINGS

The invention will be better understood by reference to the following description of the embodiments shown in the accompanying drawings wherein:

FIG. 5 is a sectional view showing a preferred configuration of each ball;
FIG. 6 is a sectional view of an alternative joint using tubular compression members as in the embodiment shown in FIGS. 3 and 4;
FIG. 7 is a sectional view of an intermediate joint using solid rod type compression members as in the embodiment shown in FIGS. 1 and 2.

DETAILED DESCRIPTION OF THE PREFERRED EMBODIMENTS

Figure 1:
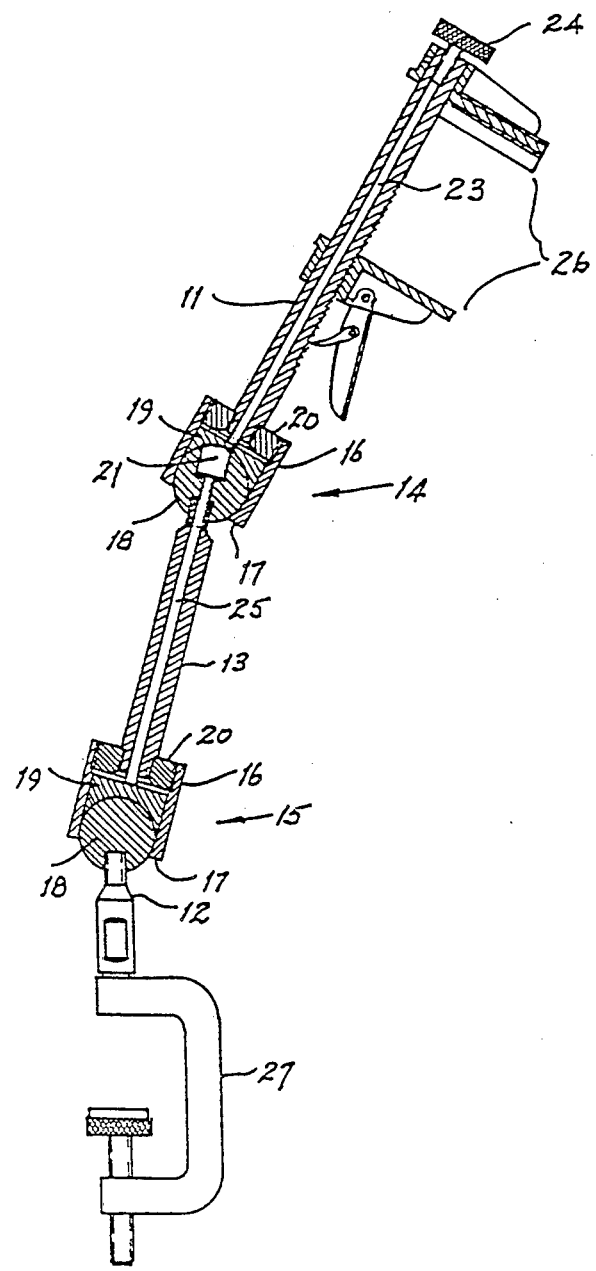
FIG. 1 is a sectional elevation of one embodiment.
Figure 2:
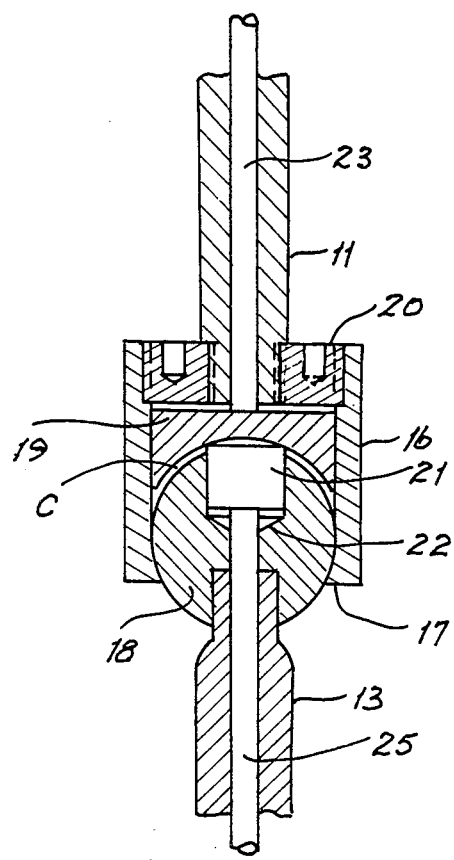
FIG. 2 is an enlarged section showing the construction of the ball joint used in the embodiment of FIG. 1.

In the embodiment shown in FIGS. 1 and 2 of the drawings end sections 11 and 12 are connected to an intermediate section 13 through ball joints 14 and 15. Each ball joint comprises a housing or socket 16, one end of which is swaged inwardly as indicated at 17 to retain a ball 18 within the housing. The ball is held within the housing by a concave cup 19 slidably positioned within the housing and held in place by a screw threaded plug 20. In accordance with the invention a locking member 21 is slidably mounted within a recess 22 in the ball so that one end projects beyond the ball and bears against the concave face of the cup 19. This provides a clearance C between the surface of the ball and the concave face of the cup. (Because of space limitations the clearance is not shown in FIG. 1). A compression rod 23 is slidably mounted in the end section 11 so that one end bears against a screw 24 at the free end of the end section and the other end bears against the cup 19 in the ball joint 14. A second compression rod 25 is slidably mounted in the intermediate section with one end bearing against the inner end of the locking member 21 in the joint 14 and the other end bearing against the concave cup 19 in the joint 15. The end section 11 is provided with an adjustable clamp 26 or other workhead attachment means whilst the end section 17 is provided with a G clamp 27. It will be appreciated that the clamp 26 and 27 may be replaced by any suitable component designed to suit the application for which the adjustable arm is to be used.

Once the arm has been adjusted to the desired position the screw 24 is tightened to apply a compressive force to the compression rod 23. This force is in turn transferred to the cup 19 in the ball joint 14, the locking member 21, the compression rod 25 and the cup 19 in ball joint 15 to the ball 18 in the ball joint 15 thus locking both ball joints against movement. Because the ball joint 15 is the final link in the series the ball therein does not have to transfer the compressive force so that a locking member, such locking member 21 as in ball joint 14, is not necessary. The ball of the joint 15 is thus fully spherical. In general it is preferable that the ball remote from the locking member is fully spherical.

Where greater angular movement is required in a given length of arm the joints 14 and 15 of FIG. 1 may be replaced by the joint as shown in FIG. 7 of the drawings. In this type of joint the housing 16 is double ended and the cup member 19 is also double ended.

Figure 3:
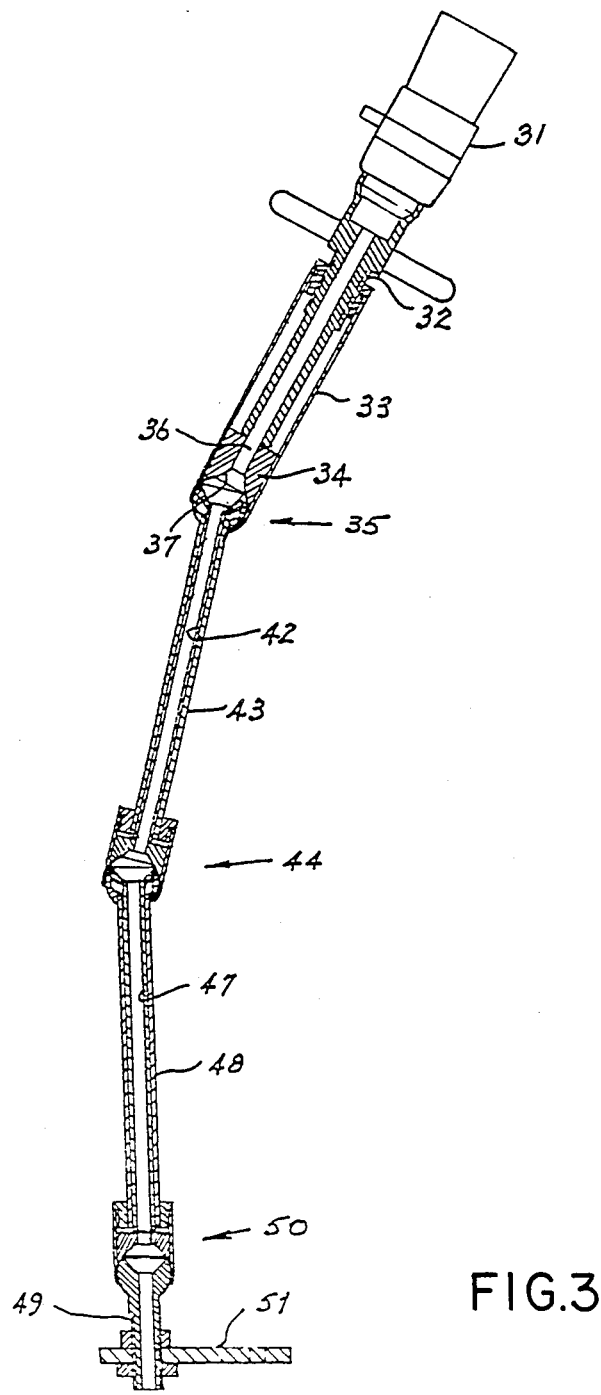
FIG. 3 is a sectional elevation of a second embodiment.
Figure 4:
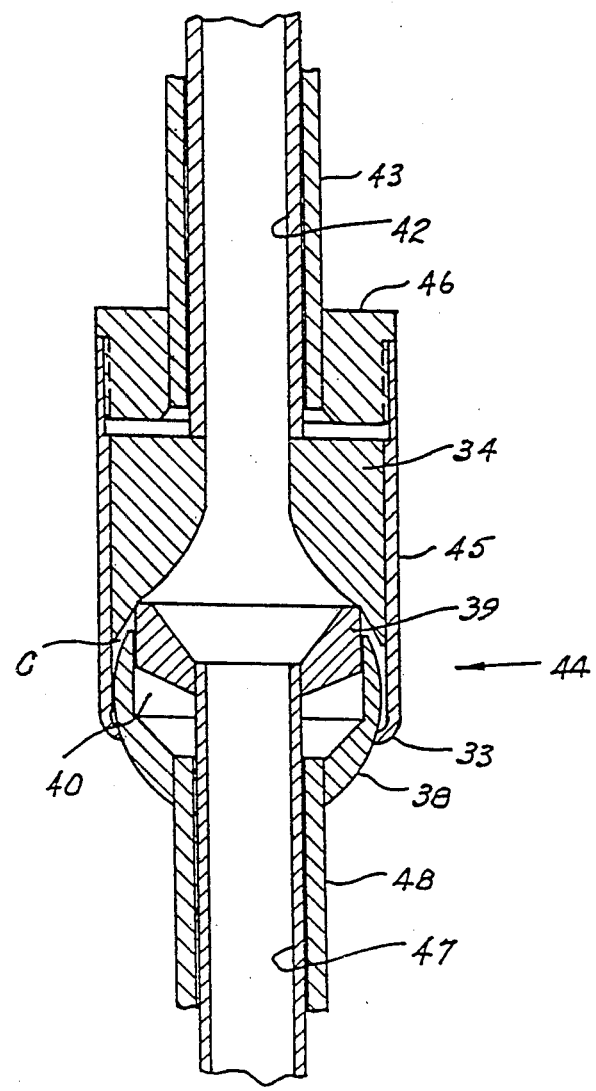
FIG. 4 is an enlarged section showing the construction of the ball joint used in the embodiment of FIG. 3.

The embodiment shown in FIGS. 3 and 4 is in the form of a lamp and the compression members are tubular to enable an electrical lead to be passed through to a socket to receive an electric lamp in the usual way. The lamp socket 31 is supported in a screw member 32 screwed into the free end of a tubular end section 33 so that it bears against the cup member 34 of a ball joint 35. A passage through the inner portion of the screw member 32, which functions as a compression member, is aligned with a passage 36 in the cup member 34, the lower end of the passage being flared outwardly as indicated at 37. The cup member 34 is located within one end of the end section 33 and mates with a ball 38 which is held in place by the inwardly swaged end of the end section 33. A locking member 39 is slidably mounted within a recess 40 in the ball and is fixed to one end of a tubular compression member 42 passing through a first intermediate section 43. The other end of the member 42 bears against the cup member 34 of a second ball joint 44 which is constructed essentially the same as ball joint 35 except that it is housed in a housing 45 with the cup member held in place by a screw threaded plug 46. The locking member 39 of the joint 44 is connected to the upper end of a tubular compression member 47 which passes through a second intermediate section 48 which is in turn connected to an end section 49 by a ball joint 50 similar with the ball joint 44, excluding the compression elements. The end section 49 is provided with a mounting base 51 to suit the user application.

If required the locking member may be located at the base or at any position intermediate the upper end and the base.

The lamp socket 31 may be replaced by any other fitting or unit which may be supplied with fluid or power through the conduit formed by the tubular compression members.

Where a greater angular movement is required in a given length of arm the joints 35, 44 and 50 may be replaced by the joint as shown in FIG. 6. In this type of joint the housing 45 is double ended as is the cup member 34.

Preferably each ball of each ball and socket joint is preferably formed as is shown in FIG. 5 by making the ball non-spherical and making the dimensions of the locking member such that its outer end coincides with what would be the normal periphery of the ball if it were spherical as indicated by the broken line in FIG. 5.

Figure 8:
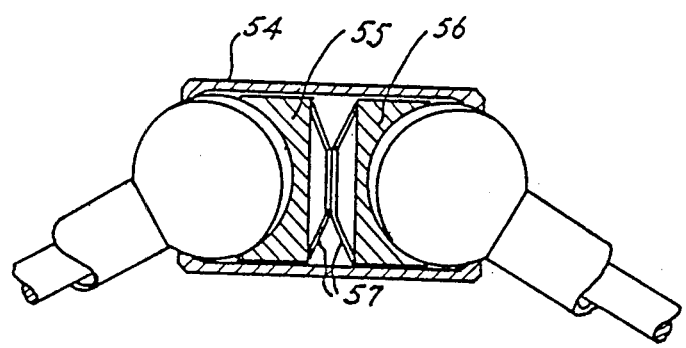
FIG. 8 shows a sustained friction form of joint suitable as an intermediate joint.

One of the joints may be arranged to provide sustained friction in the arm as shown in FIG. 8 where double ended housing 54 contains single ended cups 55 and 56 spring loaded by Belleville washers 57 or by a short compression spring. Alternatively friction adjustment (from zero to rigid locking) may be provided as shown in FIG. 8A wherein the compression spring 57 is located between locking member 21 and compression rod 25.

Figures 8A, 9:
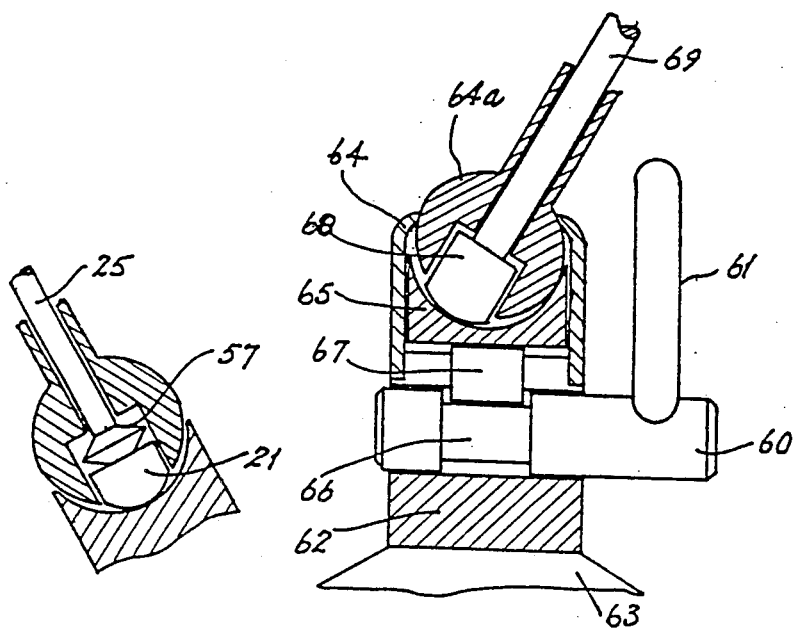
FIG. 8A shows an adjustable friction form of joint.
FIG. 9 shows an embodiment suitable for bottom locking.

A suitable form of bottom locking arrangement is shown in FIG. 9 of the drawings. A cam shaft 60 fitted with a lever or handle 61 is rotatably mounted in a cam housing 62 supported on a base 63. A socket 64 is detachably mounted on the cam housing so that it fits over a ball 64a bearing against a single ended cup member 65. A cam 66 formed on the cam shaft bears against a cam follower button 67 which in turn bears against the cup member 65. By rotating the cam shaft a compressive force to lock the assembly is applied through the cam 66, the cam follower button 67, the cup member 65, button 68 and rod 69.

The claims defining the invention are as follows:

1. An adjustable arm comprising a pair of spaced end sections and at least two intermediate sections, each section being adjustably connected to an adjacent section through a ball and socket connection, the ball and socket connection connecting adjacent intermediate sections to each other comprising a ball member affixed to one end of each of said joined intermediate sections, a housing member pivotally connected at its opposite sides to said jointed sectioned ends and having a recess receiving said ball members and a double ended rigid concave cup member slightly supported in said housing member recess and positioned between said ball members, a longitudinally extending cavity extending through each said jointed intermediate sections, and the ball member affixed thereto, a compression member slidably supported in each of said cavities and each engaging an opposite end of said concave cup member of said ball and socket joint, and means for applying a compressive force to said one of said compression members for urging said cup shaped member into frictional engagement with the other of said compression members for precluding pivotal movement of said joint.

2. An adjustable arm as claimed in claim 1 wherein a clearance is provided by making each of the ball members non-spherical and the dimensions of the compression member are such that it would coincide with the normal periphery of the ball member if it were spherical.

3. An adjustable arm as claimed in claim 1 wherein the compression members are tubular and are aligned with cavities in the concave cup member and the ball members of the ball and socket joint.

* * * * *